Patented Aug. 17, 1926.

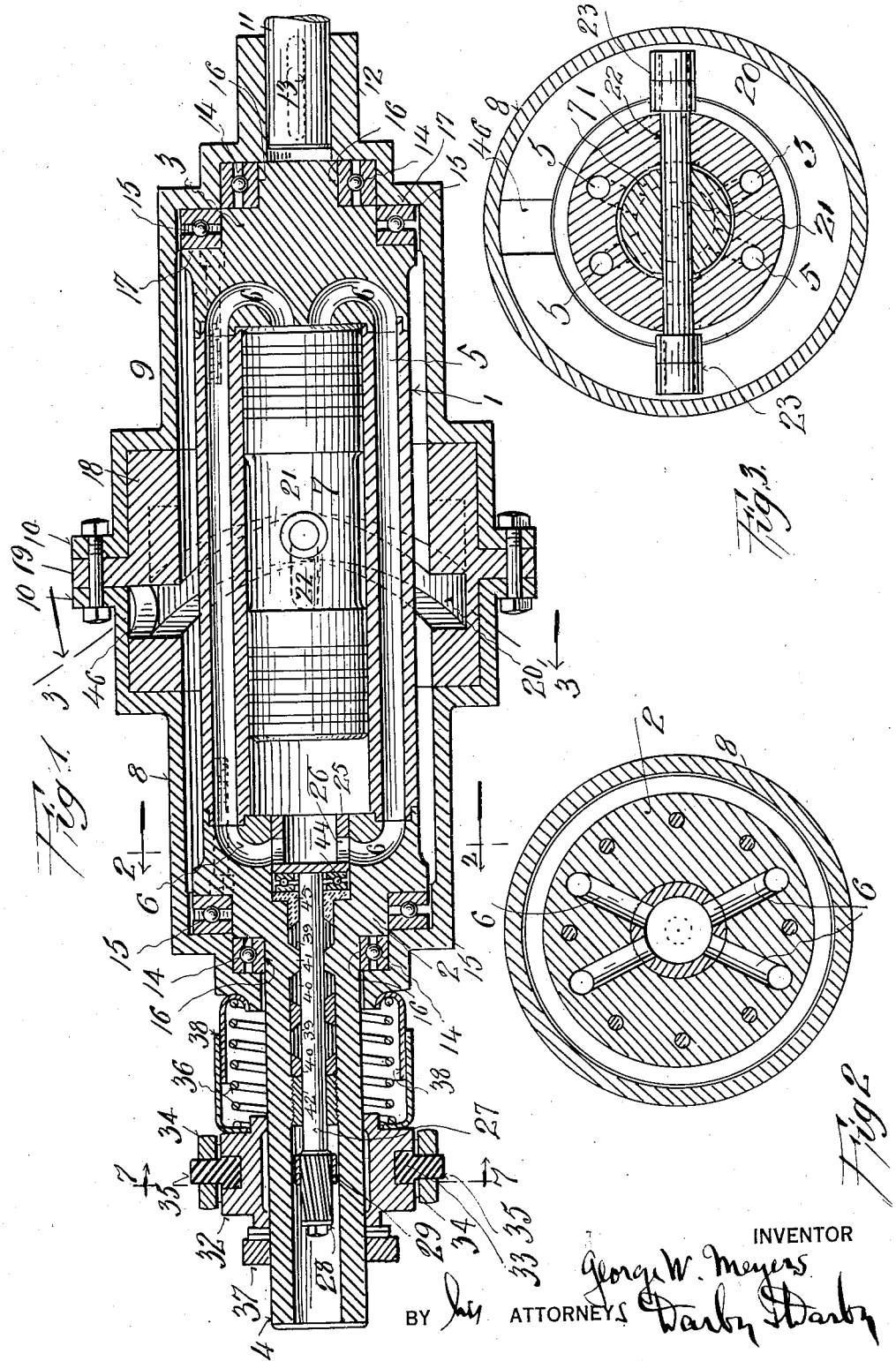

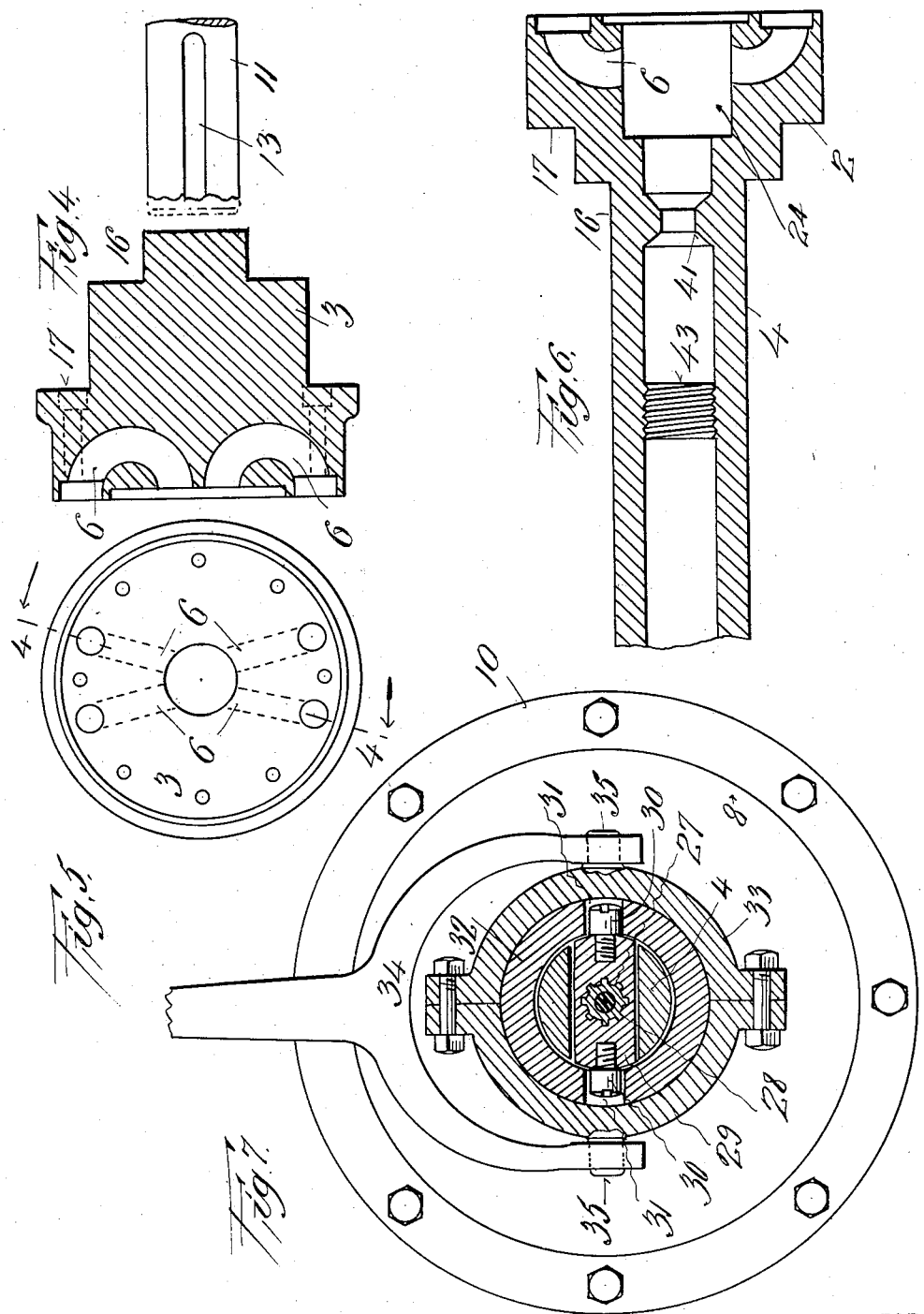

1,596,062

UNITED STATES PATENT OFFICE.

GEORGE W. MEYERS, OF RAHWAY, NEW JERSEY, ASSIGNOR TO NATIONAL PNEUMATIC COMPANY, OF NEW YORK, N. Y., A CORPORATION OF WEST VIRGINIA.

POWER-TRANSMISSION MECHANISM.

Application filed May 16, 1921. Serial No. 469,980.

This invention relates to power transmission mechanism, and particularly to mechanism of the character employed to transmit power from a prime motor to a part to be driven.

The object of the invention is to provide a power transmitting mechanism of the character referred to which is simple in structure, economical to manufacture, rugged, durable and efficient in operation.

A further object is to provide a mechanism of the character referred to which is easily controllable.

A further object is to effect a control of the power transmitting mechanism by controlling the flow of a liquid or fluid medium.

A further object is to provide mechanism for controlling the speed of the driven part without varying the speed of the prime motor and without the interposition of change speed gear devices.

A further object is to employ a reciprocating pump device as an element of a power transmission mechanism, with simple means to actuate and control the operation of the pump device.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

In the accompanying drawings,—

Fig. 1 is a view in longitudinal central section through a power transmission mechanism embodying the principles of my invention.

Figs. 2 and 3 are, respectively, views in transverse section on the lines 2, 2 and 3, 3, Fig. 1, looking in the direction of the arrows.

Fig. 4 is a view in longitudinal central section on the line 4, 4, Fig. 5, through the cylinder head at the driven end of the apparatus, a broken off portion of the driven member being also shown.

Fig. 5 is a view in plan of the inner face of the cylinder head shown in Fig. 4.

Fig. 6 is a view similar to Fig. 4 through the cylinder head at the driver end.

Fig. 7 is a view in transverse section on the line 7, 7, Fig. 1, looking in the direction of the arrows.

The same part is designated by the same reference numeral wherever it occurs throughout the several views.

In effecting the transmission of power from a prime motor to a part to be driven, it is desirable to effect variations in the speed of the driven part, without altering the speed of the prime motor, and without the shocks, impulse effects or strains incident to the employment of change gear connections and their operation, and it is particularly desirable to accomplish these results in a structure of transmission mechanism which is compact, strong and durable, simple and economical to construct, and easy to control. A mechanism having these characteristics, while capable of use in any situation where power transmission is desired, is particularly useful in the case of motor mechanism for automobiles where the space available therefor is limited, and where varying speeds are essential and constant changes of speeds are necessary.

It is among the special purposes of my present invention to provide a power transmitting mechanism which attains the advantages and desirable results above noted, and others, in a simple and efficient manner.

In carrying out my invention, I propose to employ a cylinder which is axially rotated from a prime motor, and I mount a plunger or piston to reciprocate in said cylinder and which, in the reciprocations thereof, effects a transfer from end to end of the cylinder of a suitable medium, liquid or fluid, the reciprocations of the plunger or piston being effected by means of a cam track engaged by suitable connections of the plunger or piston, said cam track being carried by a revolving member connected to the part to be driven. With such an arrangement the desired speed control is effected by suitably controlling the flow of the fluid, liquid or other medium from end to end of the cylinder under the influence of the piston reciprocations, and I employ simple and efficient devices for effecting such control.

Referring to the drawings, reference numeral 1 designates a cylinder which is open at each end. The open ends of the cylinder are closed by means of heads 2, 3. The head 2, located at the driver end of the device, is bolted on to the end of the cylinder and is provided with a tubular extension 4, at the outer end thereof, which extension is to be suitably connected to a convenient part of a prime motor to be driven therefrom. The head 3 is likewise bolted to the other open end of the cylinder.

Communication between opposite ends of the cylinder may be effected in any suitable or convenient manner. A simple arrangement is shown wherein ducts or passages 5 are formed in the cylinder wall to extend from end to end of the cylinder. The heads 2, 3, are provided with ducts 6 which are so disposed and arranged as to terminate at one end in register with the cylinder ducts or passages 5, and at their other ends open into the interior of the cylinder, when said heads are applied and secured to the ends of the cylinder.

Disposed within the cylinder to reciprocate back and forth therein is a plunger or piston 7, which, in the particular illustrative form shown is a double ended piston, and which, if desired, may be supplied with the usual or any desired packing to secure a smooth working piston fit without leakage.

The cylinder and heads are enclosed within a casing, which, in the illustrative form shown in the drawings, is made in two parts 8, 9, having annular flanges 10 at their proximate ends which are bolted together. The part 8 of the casing encloses what may be termed the driver end and head of the cylinder, while the part 9 of the casing encloses what may be termed the driven end and head of the cylinder, and said part 9 of the casing is suitably connected to the part 11 which is to be driven. This connection, in the form illustrated, is effected by providing the outer end of the casing member 9 with a tubular extension 12, which receives the end of the part 11, to be driven, said part 11, and extension 12, being engaged through a spline or key connection, or otherwise, as indicated at 13.

In order to reduce friction and secure freedom of rotation of the cylinder within the casing, or the cylinder and casing relatively to each other, suitable anti-friction or ball bearing devices, indicated at 14 and 15, are employed. The ball bearings 14 are positioned to form journals between annular surfaces 16 of the casing and cylinder heads, to secure freedom of axial rotation, while the ball bearings 15, are disposed intermediate radial shoulders 17 of the cylinder heads and the proximate radial wall surfaces of the casing to form anti-frictional end thrust bearings.

Reciprocations of the piston in the cylinder 1 may be effected in many specifically different ways. A simple and efficient way therefor is shown wherein a sleeve 18 is mounted to surround the cylinder at approximately its medial region. This sleeve is connected to the casing. To effect this, said sleeve is provided with an annular flange 19 which is received and clamped between the flanges 10 of the casing members 8, 9. The interior surface of sleeve 18 is provided with a cam track 20, in which are received suitable projections from the piston 7. As shown, such projections are afforded, in this illustrative arrangement, by a pin 21, which extends transversely through the piston, the ends of said pin extending into and working in the cam track or race way 20. The wall of the cylinder is provided with longitudinally extending slots 22, through which the ends of the pin 21 pass. If desired, suitable wear or contact rollers or sleeves 23, may be mounted on the ends of the pin which work in the cam track 20.

From the foregoing description, it will be understood that when the cylinder 1 and its heads 2, 3, are rotated by reason of the connection of the extension 4, or otherwise, from the prime motor, the piston 7 rotates with the cylinder, and, assuming that the casing is stationary, the piston will also be reciprocated back and forth from end to end of the cylinder, by reason of the ends of the pin 21, working in the cam slot or track 20. By reason of the reciprocations of the piston any fluid or liquid contained in the cylinder is caused to flow back and forth from one end to the other of the cylinder through the ducts or passages 5, 6. As long as this flow is free and unrestricted the piston operation is free and rotative movement is not imparted to the casing, nor through it to the part 11 to be driven. Now by restricting the flow of the medium from end to end of the cylinder a resistance is imposed on the free travel of the ends of the pin 21 in the cam track 20, due to retarding the reciprocatory movement of the piston by throttling the flow of medium in the cylinder. The degree of this retardation of piston reciprocation is dependent upon the extent of throttle action upon the flow of the medium from end to end of the cylinder. The resistance thus imposed on the free travel of the ends of the pin in the cam track 20 tends to exert a rotative driving action upon the casing, and through it to the part to be driven. This rotative effort varies as the retarding action on the piston operation varies and hence upon the degree of throttle of the flow of medium from end to end of the cylinder. The result is that the member 11 is thus driven, through the transmission apparatus, from the driving motor, and at a variable speed, depending upon the control of flow of the medium from end to end of the cylinder. By entirely throttling this flow the piston becomes locked against reciprocation and in this situation the casing and the member 11 is driven at their maximum speed which is the speed of the prime motor, and speed variation from zero up to this maximum is secured by controlling the flow of the medium through the ducts 5, 6.

Many different liquid or fluid media may be employed such as compressed air, water, mercury, hydraulic oil, glycerine, glycerine and alcohol, or other like fluids or liquids.

Various arrangements may be employed to secure the desired fluid or liquid flow control. I have shown a simple and efficient arrangement for this purpose, to which, however, my invention, in its broader aspects as defined in the claims, is not to be limited or restricted, wherein I provide a valve device to control the communication between the ducts 6 of the one or the other cylinder head and the interior of the cylinder. In the illustrative form shown the head 2 is formed in its inner face with a chamber 24, which opens directly into the cylinder. The ducts 6 of the head 2 open into this chamber 24. Mounted and fitting within this chamber is a valve in the form, in this instance, of a cup 25, having ports or perforations 26, through the wall thereof, corresponding to and adapted to be brought into and out of register with the ducts 6 in said head. By rotatively moving the valve 25 the ports 26 are brought more or less into coincidence with the ducts 6, thereby more or less throttling the flow of the liquid or fluid medium.

The valve device 25 may be rotatively actuated in many different ways to accomplish the throttling action referred to. A simple illustrative arrangement is shown wherein the stem portion 27 of the valve device 25 is extended outwardly into the bore of the tubular extension 4 of the head 2, and mounted upon said stem 27 is a spiral or worm gear 28, the threads of which receive a movable complementary nut member 29, which extends transversely across the tubular extension 4. Studs 30 extend from the ends of the nut member 29 into openings 31, formed at diametrically opposite points in a ring member 32, which is mounted upon to revolve with the extension 4 of head 2 but is slidable along said extension. An annular strap or ring 33 encompasses the ring member 32, being seated in an annular groove in the exterior surface thereof, and a yoke 34 has its arms arranged to straddle the strap ring 33, and engage studs 35 thereon. By rocking the yoke 34, the strap 33 is shifted along the longitudinal length of the extension 4, carrying the ring member 32 with it but without interfering with the rotative movement of the ring member 32. The ring member 32 carries along with it in its shifting movement, the nut 29. This movement of the nut, by reason of its threaded engagement with the worm teeth of the gear 28, imparts rotative movement to the latter and hence also to the valve stem 27 and valve 25, thereby securing the desired throttling control of the liquid or fluid medium in the transfer movement thereof from one end to the other of the cylinder 1.

It is desirable to insure the retention of the valve device 25 in position to cause the ports 26 thereof to register with the ducts 6 to their fullest extent. In accordance with my invention, therefore, I propose to provide means to yieldingly resist the shifting effort of the yoke 34, when operated, to cause the ring member 32 to shift along the extension 4, said means operating to normally maintain said ring member in an initial position such as will hold the valve ports 26 in full open register with the ducts 6. A simple arrangement for accomplishing this purpose is shown wherein a spring 36 is interposed between the ring member 32 and the end of the casing 8, the tension of said spring being exerted to normally hold the ring member 32 against an abutment 37 and in an initial position such as to maintain the ports 26, and ducts 6, in full open register with each other.

If desired the spring 36 may be enclosed within any suitable casing. For this purpose the telescopically arranged shell members 38 are provided.

The valve stem 27 may be suitably packed within the bore of extension 4, and various arrangements of packing may be provided for this purpose. A simple arrangement is shown wherein packing material 39 is applied around the stem 27, and disposed between the same and the interior surface of the bore of extension 4. The packing material is retained in place by suitable packing rings 40, and the whole tightly clamped in place by an exteriorly threaded sleeve 42, surrounding the stem 27, and engaging a threaded portion 43 of the bore of extension 4. If desired, the bore of extension 4 may be provided with an internal annular shoulder 41, through which the stem extends and is supported, and this shoulder forms an abutment for the packing material. A ball thrust bearing 44 may be interposed between the base of the cup valve and the base of the chamber 24, or a packing gland 45 therein.

In order to facilitate the insertion of the actuating pin 21 for piston 7, and the antifriction rollers or sleeves 23, in assembling the apparatus, the sleeve member 18 is formed with an opening 46 through the wall thereof into the cam race or channel 20. By properly positioning the cylinder and piston with reference to the opening 46 the pin 21 may be dropped through the opening 46 and into position through the slots 22 in the cylinder wall and the transverse passage through the piston, and then the sleeves 23 for one end of the pin placed in position. The cylinder and piston are then revolved one-half a revolution and the sleeves 23 applied to the other end of said pin, and then the opening 46 may be closed in any simple way.

From the foregoing description it will be seen that I provide an exceedingly simple, compact and rugged power transmission mechanism, which is capable of easy control and whereby speed variation is secured from zero to the maximum speed of the driving motor without varying the speed of such driving motor.

I wish it to be understood that my invention is not limited or restricted to the details of structure shown and described, as wide variations therefrom might readily occur to persons skilled in the art and still employ the principle or mode of operation I have described and pointed out.

What I claim as new and useful, and of my own invention, and desire to secure by Letters Patent, is:—

1. In a power transmission mechanism, a driving member and a member to be driven, said driving member including a cylinder having longitudinal openings, a piston mounted to reciprocate in said cylinder, means to open communication between said openings at opposite ends of the cylinder, a casing enclosing said cylinder and connected to the member to be driven, engaging connections intermediate the piston and casing to reciprocate the piston, and means to control said communication means.

2. In a power transmitting mechanism, a driving member and a driven member, driving connections intermediate said members including a cylinder and a casing, said cylinder having parallel passages communicating between opposite ends thereof, a piston mounted to reciprocate within said cylinder and having frictional connection with the casing, and means to control said passages to vary the speed of reciprocal movements of said piston.

3. In a power transmitting mechanism, a driving member and a driven member, driving connections intermediate said members including a cylinder and casing, said cylinder having longitudinal parallel passages communicating between opposite ends thereof, a piston mounted to reciprocate within said cylinder and having frictional connection with the casing, and a valve device to control the said passages.

4. In a power transmitting mechanism, a driving member and a driven member, driving connections intermediate said members including a cylinder and casing, said cylinder having a plurality of passages communicating between opposite ends thereof, a piston mounted to reciprocate within said cylinder and having frictional connection with the casing, and an exteriorly controllable valve device to vary the effective areas of said passages.

5. In a power transmitting mechanism, a driving member and a driven member, driving connections intermediate said members including a cylinder having a plurality of passages communicating between opposite ends thereof, a piston mounted to reciprocate within said cylinder and having frictional connection with the driven member, a valve device to control the effective areas of said passages, the stem of said valve having a gear thereon, a slidable nut member engaging said gear and a yoke member having connection with said nut to shift the latter.

6. In a power transmitting mechanism, a driving member and a driven member, driving connections intermediate said members including a cylinder and casing, said cylinder having a plurality of passages communicating between opposite ends thereof, a piston mounted to reciprocate within said cylinder and having frictional connection with the casing, a valve device to control the effective areas of said passages, the stem of said valve having a gear thereon, a slidable nut member engaging said gear, means normally operating to hold the nut member in position to maintain the maximum of opening of said passages, and means to shift said nut member to restrict the opening of said passages.

7. In a power transmitting mechanism, a driving member and a driven member, driving connections intermediate said members including a cylinder and casing, said cylinder having pairs of passages communicating between opposite ends thereof, a piston mounted to reciprocate within said cylinder and having frictional connection with the casing, a valve device to control the effective areas of said passages, the stem of said valve having a gear thereon, a slidable nut member engaging said gear, yielding tension means operating to normally maintain said passages in maximum open condition, and means to shift said nut member to reduce the effective area of said passages.

8. In a power transmitting mechanism, a driving member and a driven member, driving connections intermediate said members including a cylinder and casing, said cylinder having pairs of passages communicating between opposite ends thereof, a piston mounted to reciprocate within said cylinder and having frictional connection with the casing, a valve device to control the said passages, yielding tension means to hold said valve in initial position, to open said passages to fullest extent, thereby preventing driving transmission to the driven member, and means to shift said valve against the action of said tension means.

9. In a power transmitting mechanism, a driving member and a driven member, driving connections intermediate said members including a cylinder having pairs of passages communicating between opposite ends thereof, a piston mounted to reciprocate within said cylinder, a sleeve surrounding said cylinder and having a cam groove, said piston having means to engage and work in said groove, and means to control said passages to vary the speed of reciprocatory movements of said piston.

10. In a power transmitting mechanism, a driving member and a driven member, driving connections intermediate said members including a cylinder having passages communicating between opposite ends thereof, a piston mounted to reciprocate within said cylinder, a sleeve surrounding said cylinder and having a cam groove, a pin carried by said piston and having its ends engaging in said groove, and means to control said passages to vary the speed of said piston.

11. In a power transmitting mechanism, a driving member and a driven member, driving connections intermediate said members including a cylinder having passages communicating between opposite ends thereof, a piston mounted to reciprocate within said cylinder, a sleeve surrounding said cylinder and having a cam track, a pin carried by said piston and having its ends engaging in said track, and a valve to control said passages.

12. In a power transmitting mechanism, a driving member and a driven member, driving connections intermediate said members including a cylinder having passages communicating between opposite ends thereof, a piston mounted to reciprocate within said cylinder, a sleeve surrounding said cylinder and having a cam groove, a pin carried by said piston and having its ends engaging in said groove, a valve to control said passages, and means to shift said valve to control said passages.

13. In a power transmission mechanism, a driving member and a driven member, driving connections intermediate said members, including a cylinder having passages communicating between opposite ends thereof, a piston operating in said cylinder, a sleeve surrounding said cylinder and having an internal annular cam groove, said piston having projections at opposite sides thereof, extending through the cylinder wall and working in said cam groove, a valve to control said passages, and means to control said valve at will.

14. In a power transmission mechanism, a driving member and a driven member, driving connections intermediate said members, including a casing, a cylinder disposed within said casing and having passages communicating between opposite ends thereof, a piston operating in said cylinder, a sleeve carried by said casing and having an internal annular cam groove, said piston having projections at opposite sides thereof extending through the cylinder wall and working in said cam groove, a valve to control said passages, and means to control said valve at will.

15. In a power transmission mechanism, a driving member and a driven member, driving connections intermediate said members, including a casing and a cylinder, mounted the one inside the other for relative rotation, journal and end thrust bearings interposed between said casing and cylinder, said cylinder having passages communicating between opposite ends thereof, a piston operating in said cylinder, a sleeve carried by the casing and surrounding the cylinder and having an internal annular groove, said piston having projections at opposite sides extending through the walls of the cylinder and working in said groove, a valve to control said passages, and means to control said valve.

In testimony whereof I have hereunto set my hand on this 12th day of May, A. D., 1921.

GEORGE W. MEYERS.